(12) United States Patent
Siebert (10) Patent No.: US 10,196,925 B2
(45) Date of Patent: Feb. 5, 2019

(54) VSV ACTUATION ARRANGEMENT

(71) Applicant: ROLLS-ROYCE plc, London (GB)

(72) Inventor: Annegret W. Siebert, Derby (GB)

(73) Assignee: ROLLS-ROYCE plc, London (GB)

(*) Notice: Subject to any disclaimer, the term of this patent is extended or adjusted under 35 U.S.C. 154(b) by 541 days.

(21) Appl. No.: 15/092,132

(22) Filed: Apr. 6, 2016

(65) Prior Publication Data

US 2016/0312650 A1    Oct. 27, 2016

(30) Foreign Application Priority Data

Apr. 27, 2015   (GB) .................................. 1507083.2

(51) Int. Cl.
| | |
|---|---|
| F01D 17/16 | (2006.01) |
| F04D 29/56 | (2006.01) |
| F01D 17/20 | (2006.01) |
| F02C 9/20 | (2006.01) |

(52) U.S. Cl.
CPC .......... *F01D 17/162* (2013.01); *F01D 17/20* (2013.01); *F02C 9/20* (2013.01); *F04D 29/563* (2013.01); *F05D 2260/4021* (2013.01); *Y02T 50/672* (2013.01)

(58) Field of Classification Search
CPC ........ F01D 17/16; F01D 17/162; F01D 17/20; F02C 9/20; F02C 9/22; F05D 2260/4021
See application file for complete search history.

(56) References Cited

U.S. PATENT DOCUMENTS

| | | | | |
|---|---|---|---|---|
| 2,388,208 A | * | 10/1945 | Foss ..................... | F01D 17/162 |
| | | | | 123/41.58 |
| 3,645,144 A | * | 2/1972 | Barrows, Jr. ......... | F04D 29/462 |
| | | | | 74/89.2 |
| 2012/0134784 A1 | | 5/2012 | Yen et al. | |

OTHER PUBLICATIONS

Oct. 6, 2015 Search Report issued in British Patent Application No. GB1507083.2.

* cited by examiner

*Primary Examiner* — Jason Shanske
*Assistant Examiner* — Maxime Adjagbe
(74) *Attorney, Agent, or Firm* — Oliff PLC (57) ABSTRACT

An actuation arrangement for effecting actuation of a variable stator vane pivotally mounted on a tubular casing. The actuation arrangement includes: an actuator connector connected to the variable stator vane via an actuating lever; an anchor fixedly mounted relative to the circumference of the tubular casing; an actuator; and a belt extending from the actuator to the fixed pulley. The actuation arrangement further includes a movable pulley movable relative to the tubular casing and connected to the actuator connector. The belt has a loop portion provided between the proximal and distal ends which loops around the movable pulley, the loop portion for transferring forces generated in the belt by the actuator to the movable pulley to effect movement of the movable pulley and actuator connector towards the anchor to effect actuation of the variable stator vane via the actuating lever.

16 Claims, 7 Drawing Sheets

VSV ACTUATION ARRANGEMENT

FIELD OF THE INVENTION

The present invention relates to the control of variable stator vanes in a gas turbine engine.

BACKGROUND OF THE INVENTION

During operation of a gas turbine engine using a multi-stage axial compressor, the turbine rotor is turned at high speed by the turbine so that air is continuously introduced into the compressor, accelerated by the rotating blades and swept rearwards onto an adjacent row of stator vanes.

The stator vanes correct the deflection given to the air by the rotor blades and present the air at the correct angle to the next stage of rotor blades.

It is known to provide variable stator vanes (VSVs).

The manner of operation of a known variable stator vane system is described with reference to FIG. 1 which shows a cut-away side view of part of a compressor section of an aircraft gas turbine engine.

Figure 1:
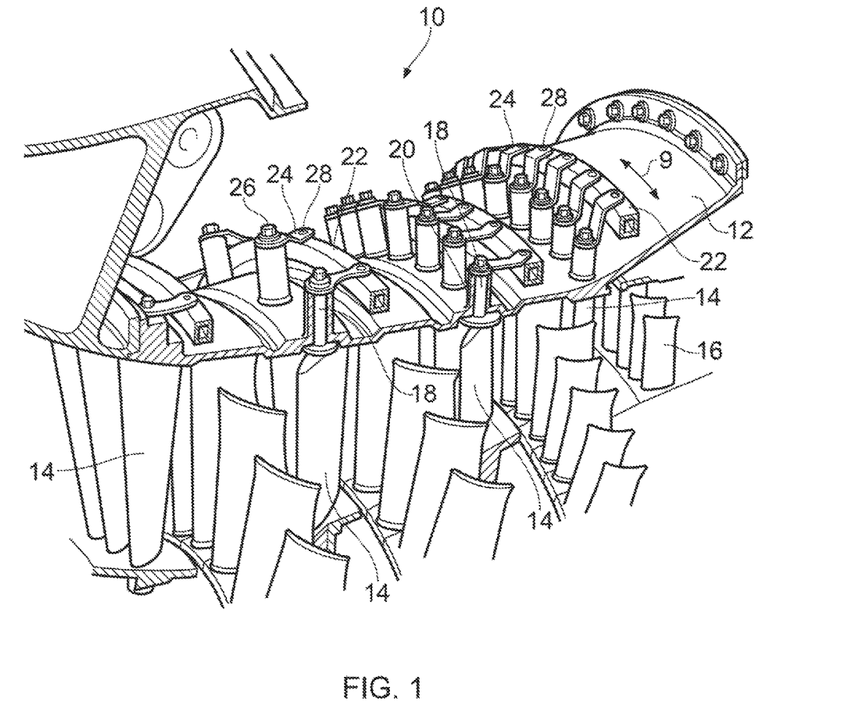
FIG. 1 shows a compressor section of an aircraft gas turbine engine.

In FIG. 1 there is shown the compressor section 10 of an aircraft gas turbine engine. In the tubular casing 12 of the compressor section are mounted sets of stator vanes 14 circumferentially about the central axis of the compressor section. A corresponding set of rotor vanes 16 is mounted downstream of each set of stator vanes 14. Each stator vane 14 terminates at the casing 12 in a stem 18 rotatable in a bush bearing 20 on the outside of the casing, the end of the stem extending beyond the bush.

Located externally of the casing 12 and adjacent each set of stator vanes 14 are actuator rings 22 (also known as unison rings) extending circumferentially round the casing. With each stator vane 14 in a set, the vane stem 18 is connected to the corresponding actuator ring 22 by means of an actuating lever 24. One end of the actuating lever 24 is clamped to the end of the vane stem 18 by means of a bolt 26 so that there is no relative movement between the stem and the lever. The other end of the lever 24 is connected to the actuator ring 22 by a pin 28 which is rotatable in a bush bearing located in the ring.

The actuator ring 22 is arranged so that it may be rotated in a circumferential direction about the central axis of the compressor section, i.e. in either direction of arrow 9. Consequently, rotation of the actuator ring 22 will, by means of the actuating levers 24, cause rotation of each stator vane 14 about its own axis and thus enable the vanes 14 to assume required angles of incidence to the incoming air.

In order to rotate the actuator ring 22, an actuation arrangement (not shown) is provided. The actuation arrangement typically comprises an actuator which is driven by fuel pressure to move an actuating belt which passes around a crank shaft and connects to the actuator ring. As the actuating belt is moved by the actuator, movement of the actuator ring (in a circumferential direction about the central axis of the compressor section) is effected which results in movement of the actuating levers 24 and, consequently, adjustment of the angle of the stator vanes 14 relative to the central axis.

In order to move the actuator ring 22, actuating levers 24 and stator vanes 14, the actuation load applied by the actuator has to overcome the frictional resistance between components (e.g. between the stems 18/bush bearings 20 and the pins 28 located in bush bearings on the actuating ring 22) resulting from aerodynamic loads on the VSVs.

There is a desire to reduce the actuation load. A high actuation load requires a high fuel pressure which places undesirable demands on the fuel system architecture. Excessively high actuation loads resulting in immovable VSVs have been known to result in numerous aborted take-offs which leads to undesirable service interruption.

SUMMARY OF THE INVENTION

In a first aspect, the present invention provides an actuation arrangement for effecting actuation of a variable stator vane pivotally mounted on a tubular casing, said actuation arrangement comprising:
- an actuator connector connected to the variable stator vane via an actuating lever;
- an anchor fixedly mounted relative to the circumference of said tubular casing;
- an actuator; and
- a belt having a proximal end affixed to the actuator and a distal end affixed to the anchor, wherein the actuation arrangement further comprises a movable pulley movable relative to said tubular casing and connected to the actuator connector and wherein the belt has a loop portion provided between the proximal and distal ends which loops around the movable pulley, the loop portion for transferring forces generated in the belt by the actuator to the movable pulley to effect movement of the movable pulley and thereby the actuator connector towards the anchor to effect actuation of the variable stator vane via the actuating lever.

By providing a movable pulley connected to the actuator connector and looping the belt around the movable pulley (which is affixed to the actuator connector) before fixing it to an anchor, the pulling length of the belt increases relative to the prior art arrangement where a fixed pulley is used and thus the frictional resistance during actuation of the VSVs can be overcome with a reduced actuation load.

Optional features of the invention will now be set out. These are applicable singly or in any combination with any aspect of the invention.

In some embodiments, the actuator is a winding actuator that winds or spools the belt to reduce the length of the belt extending from the actuator. This reduction in length of the belt results in a force on the moveable pulley which pulls it (and the actuator ring to which it is connected) towards the actuator which effects actuation of the actuating lever and variable stator vane.

In some embodiments, the movable pulley is movable in a circumferential direction about said tubular casing.

In these embodiments, the actuation arrangement further comprises at least one circumferentially-extending guide rail mounted on the tubular casing for supporting and guiding the movable pulley in a circumferential direction about the tubular casing. The movable pulley may be retained between two circumferentially-extending guide rails e.g. by a cover or tube.

In some embodiments, the movable pulley is movable in an axial direction along said tubular casing.

In these embodiments, the actuation arrangement further comprises at least one axially-extending guide rail mounted on the tubular casing for supporting and guiding the movable pulley in an axial direction along the tubular casing. The movable pulley may be retained between two axially-extending guide rails e.g. by a cover or tube.

In some embodiments, the actuator connector may be an actuator ring which at least partially circumscribes the tubular casing. The connection between the movable pulley and the actuator ring results in movement of the actuator ring in a circumferential direction about said tubular casing as the movable pulley moves.

In some embodiments, the anchor is nearer to the actuator than the movable pulley. In these embodiments, the belt extends from the actuator, the loop portion loops around the movable pulley and the belt extends to the anchor where its distal end is fixed.

In embodiments e.g. where the movable pulley and anchor are axially aligned, a portion of the belt between the proximal end and the loop portion may pass over the movable pulley.

In some embodiments, the movable pulley is nearer to the actuator than the anchor. In these embodiments, the belt includes a further loop portion positioned between the proximal end and the loop portion, the further loop portion for looping around the anchor or around a further anchor, the further anchor being fixedly mounted relative to the circumference of said tubular casing.

The further anchor may be affixed to the tubular casing such that it is axially spaced from the anchor e.g. the further anchor and anchor may be axially opposed on the tubular casing across the actuator ring.

In some embodiments, the belt extends from the actuator, the further loop portion loops around either the anchor or the further anchor, the loop portion loops around the movable pulley and then the belt extends to the anchor/back to the anchor where its distal end is fixed.

In some embodiments e.g. where the movable pulley and anchor are axially aligned, a portion of the belt between the proximal end and the further loop portion may pass over the movable pulley.

In some embodiments, the anchor and/or the further anchor is a fixed pulley/further fixed pulley mounted relative to the circumference of the tubular casing e.g. mounted on the tubular casing. In some embodiments, the anchor/fixed pulley, further anchor/further fixed pulley and/or moveable pulley each comprise(s) at least one respective groove for housing the loop portion or further loop portion of the belt. In some embodiments, the anchor/fixed pulley and/or moveable pulley each comprise(s) two respective grooves for housing the belt, one for housing the loop portion/further loop portion and one for guiding the passage of the belt towards the anchor/fixed pulley (in the case of the movable pulley) or towards the movable pulley (in the case of the anchor/fixed pulley). The grooves may be defined by three axially-spaced flanges. The central flange may have a smaller radius than the two outer flanges.

In some embodiments where the anchor/fixed pulley is nearer to the actuator than the movable pulley, the belt passes from the actuator, the loop portion loops around the movable pulley within a first groove of the movable pulley and then the belt extends to the anchor/fixed pulley. In some of these embodiments, the belt may pass over the anchor/fixed pulley e.g. in a first groove of the anchor/fixed pulley between the actuator and the movable pulley.

In some embodiments where the anchor/fixed pulley is further from the actuator than the movable pulley, the belt passes from the actuator, the further loop portion loops around the anchor/fixed pulley within a first groove of the anchor/fixed pulley, the first loop portion loops around the movable pulley in a first groove of the movable pulley and then the belt extends back to the anchor/fixed pulley. In these embodiments, the belt may pass over the movable pulley e.g. in a second groove en route from the actuator to the anchor/fixed pulley.

In other embodiments where the anchor/fixed pulley is further from the actuator than the movable pulley, the belt passes from the actuator, the further loop portion loops around the further anchor/further fixed pulley within a first groove of the further anchor/further fixed pulley, the loop portion loops around the movable pulley in a first groove of the movable pulley and then the belt extends to the anchor/fixed pulley.

In some embodiments, the actuation arrangement may further comprise one or more groves, recesses or pipes (e.g. flexible pipes) through which the belt passes to guide the path of the belt.

In some embodiments, the actuation arrangement comprises a biasing mechanism for biasing the anchor/fixed pulley and movable pulley away from one another. This helps maintain the required minimum distance between the two pulleys (which is typically 1.5 times the pulley diameter) and to restore the spacing between the pulleys after they are brought together by the actuation force. The biasing mechanism may comprise a tension or compression spring. The compression spring may be connected between the anchor/fixed pulley and movable pulley. The tension spring may be connected to the movable pulley and the tubular casing.

In some embodiments, the actuation mechanism comprises a restoring mechanism for moving the actuator connector in an opposing direction to the actuator. This allows the variable stator vanes to return to a rest position after actuation. The restoring mechanism may be a spring connected between the actuator connector and the tubular housing.

One or both of the pulleys may be formed of a lightweight material such as aluminium optionally with a polymer coating to impart temperature/wear resistance. One or both of the pulleys may, alternatively, be made of a lightweight composite material e.g. metal/matrix composite.

The term "belt" is used to additionally encompass a cable, rope, cord or chain.

The movable pulley may be connected directly to the actuator connector (e.g. mounted on the actuator connector) or there may be a link element between the two. Movement of the movable pulley effects movement of the actuator connector.

The link element may be pivotally mounted on the actuator connector. For example, in some embodiments, the link element is a lever e.g. having two angled portions with a pivot point connected to the actuator connector at the join between the two angled portions. The angled portions may extend perpendicularly to one another e.g. the link element may be an L-shaped link element.

In some embodiments, the actuation arrangement further comprises a second belt extending from the actuator to the anchor/fixed pulley or to a second anchor/fixed pulley; and a second movable pulley movable relative to said tubular casing and connected to the actuator connector. The second anchor/fixed pulley may be circumferentially spaced about the tubular casing from the first anchor/fixed pulley. The second movable pulley may be connected to the actuator connector at a position spaced from the connection between the actuator connector and the first movable pulley. For example, the first and second movable pulleys may be connected at opposing ends of the actuator connector. In this way, the actuator is adapted to effect movement of the belt and the second belt (and consequently the actuator connector) in opposing directions e.g. opposing axial or circumferential directions.

In some embodiments, the first and second movable pulleys are both connected to a common link element e.g. as described above. For example, each of the angled portions may include an extension, one extension connecting the first movable pulley to the actuator connector via the link element and the other connecting the second movable pulley to the actuator connector via the link element. In these embodiments, axial movement of the first and second movable pulleys (e.g. in axial guide rails) results in pivoting of the link element on the actuator connector and circumferential movement of the actuator connector.

In other embodiments, the actuation arrangement further comprises a second anchor/fixed pulley fixedly mounted relative to the circumference of said tubular casing; a second belt extending from the actuator to the second anchor/fixed pulley; and a second movable pulley movable relative to said tubular casing and connected to a second actuator connector. The second anchor/fixed pulley may be circumferentially spaced about the tubular casing from the first anchor/fixed pulley. The second movable pulley may be connected to the second actuator connector at a position spaced from the connection between the actuator connector and the first movable pulley. For example, the first movable pulleys may be connected at a first end of the actuator connector and the second moveable pulley may be connected at a first end of the second actuator connector with the first ends of the actuator connector and second actuator connector spaced from one another (e.g. substantially diametrically opposed) around the circumference of the tubular casing. In this way, the actuator is adapted to effect movement of the actuator connector and second actuator connector in opposing directions e.g. opposing axial or circumferential directions.

In some embodiments with two belts and two movable pulleys, the actuator is replaced with two actuators, one connected to the belt and one connected to the second belt to effect opposing forces on the belts and consequently on the actuator connector(s). Where there is a single actuator connector, one actuator is adapted to move the actuator connector and the first movable pulley in a first axial or circumferential direction and the second actuator is adapted to move the actuator connector and the second movable pulley in a second, opposing axial or circumferential direction. Where there are two actuator connectors, one actuator is adapted to move the actuator connector and the first movable pulley in a first axial or circumferential direction and the second actuator is adapted to move the second actuator connector and the second movable pulley in a second, opposing axial or circumferential direction.

These embodiments allow movement of the variable stator in opposing angular directions.

In embodiments with two actuators acting on a single actuator connector, in order to avoid undesirable simultaneous pulling forces on the actuator connector, the actuation arrangement may comprise a divert mechanism to ensure only one actuator is operable at any time. The divert mechanism may comprise a switch valve for directing actuating fluid to one or other (but not both) of the actuators. In the case of electric actuation, the divert mechanism may comprise an electric switch that directs power to one or other (but not both) of the actuators.

A back-up actuator may be provided for the or each actuator to accommodate any failure of the respective actuator.

In some embodiments, the actuation arrangement comprises a second guide rail as described above.

In some embodiments, the actuation arrangement comprises a second biasing mechanism for biasing the second anchor/fixed pulley and second movable pulley away from one another.

The second actuator, second movable pulley, second anchor/fixed pulley and second belt are as described above for the actuator, movable pulley, anchor/fixed pulley and belt.

In a second aspect, the present invention provides an axial multi-stage compressor comprising an actuation arrangement according to the first aspect.

In a third aspect, the present invention provides a gas turbine engine comprising an axial multi-stage compressor according to the second aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 2:
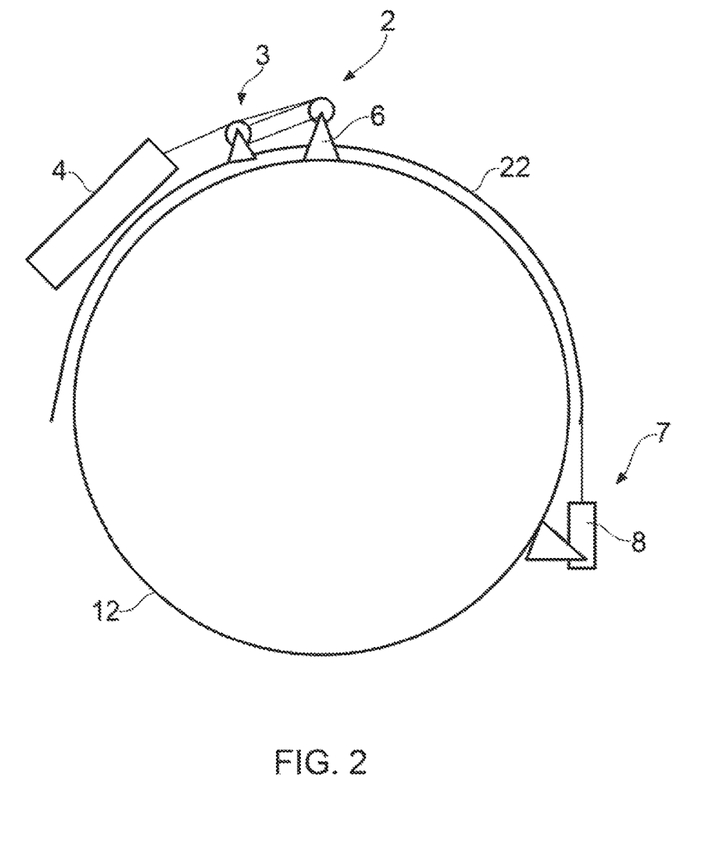
FIG. 2 shows an axial cross-section through a first embodiment of the present invention.

FIG. 2 shows an axial cross section through a first embodiment.

The first embodiment of the actuation arrangement 1 comprises an actuator ring 22 which partially circumscribes a tubular casing 12. The tubular casing 12 carries the radially outer ends of the variable stator vanes (not shown) which are each connected to the actuator ring 22 via a respective actuating lever (not shown).

The actuation arrangement comprises a fixed pulley 2 which comprises a mount 6 which secures the fixed pulley 2 on the tubular casing 12 in a fixed relationship with the circumference of the tubular casing.

The actuation arrangement further comprises a movable pulley 3 which is mounted between circumferentially-extending guide rails (not shown) which are, in turn, mounted on the tubular casing 12. The movable pulley 3 is free to pivot about its central axis and can also move in a between the guide rails in a circumferential direction around the tubular casing 12.

The movable pulley 3 is connected to the actuator ring 22.

An actuator 4 is provided proximal the movable pulley 3. This is connected to a belt 5 which extends from a proximal end at the actuator 4 to a distal end at the fixed pulley. The belt has a loop portion extending around the movable pulley 3 and a further loop portion extending around the fixed pulley 2.

The movable pulley has two circumferential grooves (not shown), one for receiving the loop portion, whilst the fixed pulley has at least one circumferential groove for receiving the further loop portion.

The belt extends over the movable pulley 3 in a first groove and the further loop portion loops around the fixed pulley 2 within the at least one circumferential groove. The belt then extends back to the movable pulley where the loop portion loops around the movable pulley in a second circumferential groove before the belt extends back to the fixed pulley.

When the actuator 4 exerts a pulling force on the belt 5 by winding it within the actuator and thus reducing the length of the belt extending from the actuator, the force (actuation load) is transmitted through the belt 5 to the movable pulley 3 to effect a circumferential movement (in a clockwise direction in FIG. 2) of the movable pulley 3 and hence the actuator ring 22 which results in an angle adjustment for the stator vanes. This arrangement reduces the amount of force needed to move the actuator ring to ⅓ (since there are 3 lengths of belt extending between the pulleys).

The actuation arrangement also includes a restoring mechanism 7 comprising a spring 8 connected between the actuator connector 22 and the tubular housing 12. This moves the actuator connector 22 in an opposing direction to the actuator to allow the variable stator vanes to return to a rest position after actuation.

Figure 3:
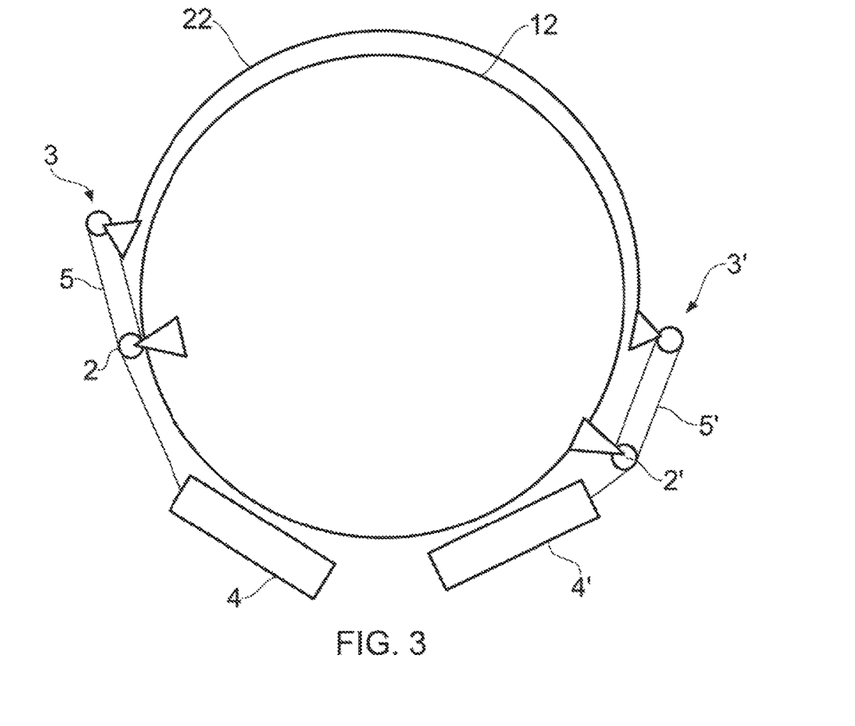
FIG. 3 shows an axial cross-section through a second embodiment of the present invention with the VSV vanes in a neutral position.
Figure 4:
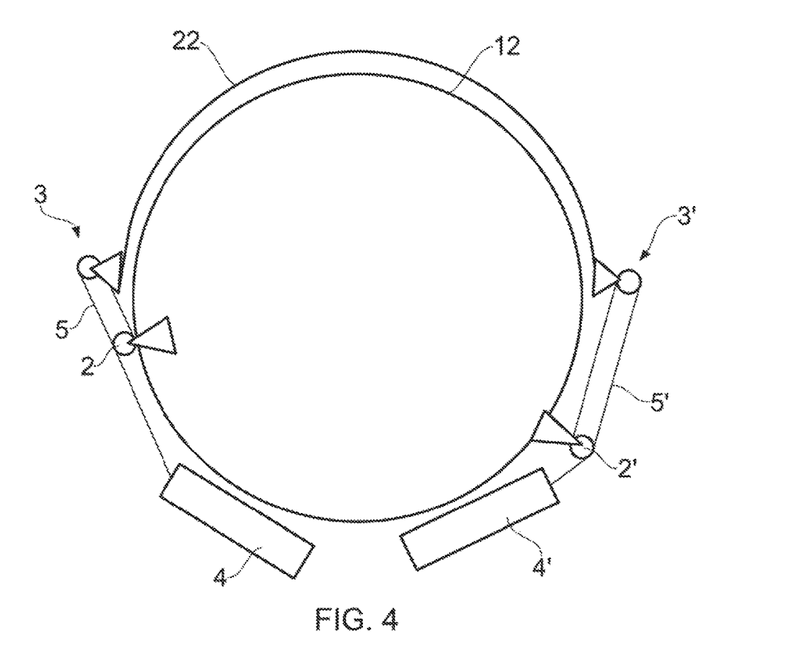
FIG. 4 shows an axial cross-section through a second embodiment of the present invention with the VSV vanes in an open.
Figure 5:
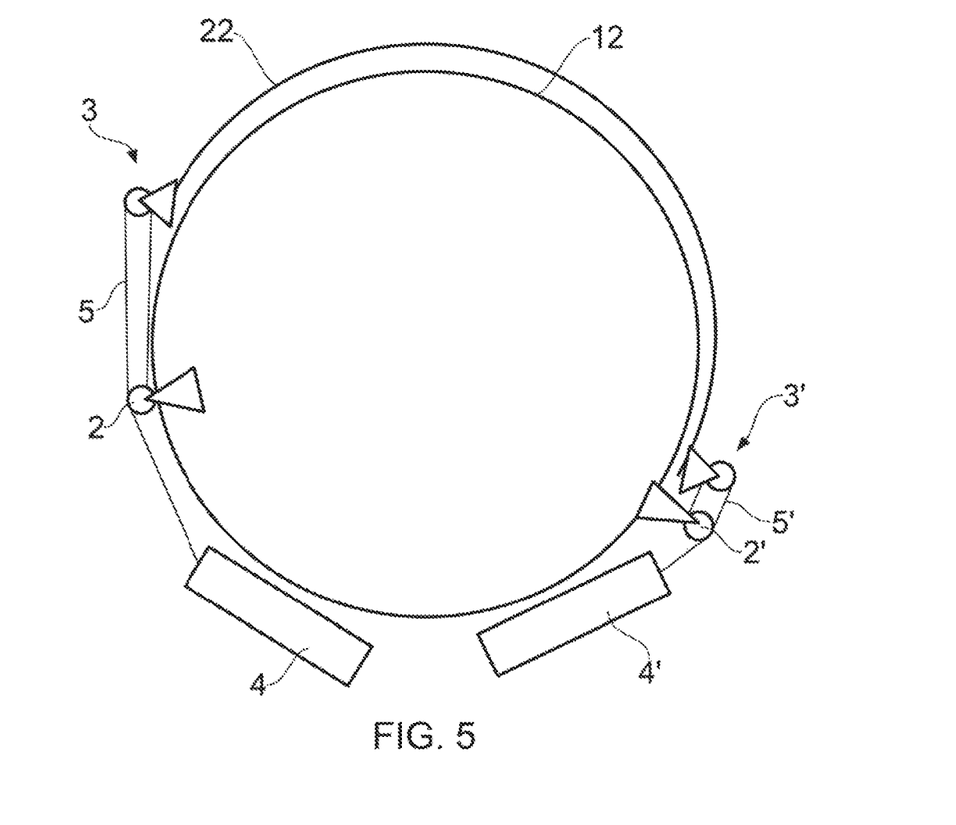
FIG. 5 shows an axial cross-section through a second embodiment of the present invention with the VSV vanes in a closed position.

FIGS. 3, 4 and 5 show a second embodiment of the present invention in three different positions.

FIG. 3 shows the second embodiment with the stator vanes (not shown) in a neutral position.

In this embodiment, the movable pulley 3 and fixed pulley 2 each have at least one circumferential groove.

In the second embodiment, the actuator 4 is provided proximal the fixed pulley 2. The belt 5 extends from the proximal end at the actuator 4 over the fixed pulley 2 within the least one circumferential groove and the loop portion loops around the movable pulley 3 within the at least one circumferential groove before the belt extends to its distal end at the fixed pulley 2.

When the actuator 4 exerts a pulling force on the belt 5 by winding it within the actuator and thus reducing the length of the belt extending from the actuator, the force (actuation load) is transmitted through the belt 5 to the movable pulley to effect a circumferential movement (in an anti-clockwise direction in FIG. 3) of the movable pulley and hence the actuator ring 22 which results in an angle adjustment to open the stator vanes as shown in FIG. 4. This arrangement reduces the amount of force needed to move the actuator ring by ½ (since there are 2 lengths of belt extending between the pulleys).

In order to move the stator vanes back to the neutral position shown in FIG. 3 or to move the stator vanes from the neutral position to the closed position shown in FIG. 5 (i.e. to move the actuator ring in a clockwise direction in FIG. 3/5), the actuation arrangement further comprises a second actuator 4' which is connected to a second belt 5' which passes over a second fixed pulley 2', with a loop portion looping around a second movable pulley 3' and back to the fixed pulley 2'.

The movable pulleys 3, 3' are connected at circumferentially opposing ends of the actuator connector. The fixed pulleys 2, 2' are circumferentially spaced around the tubular casing 12 from one another.

When the second actuator 4' exerts a pulling force on the second belt 5' by winding it within the second actuator 4' and thus reducing the length of the second belt 5' extending from the second actuator 4', the force (actuation load) is transmitted through the second belt 5' to the second movable pulley 3' to effect a circumferential movement (in a clockwise direction in FIG. 3/5) of the second movable pulley 3' and hence the actuator ring 22 in the opposite direction to the movement effected by the first actuator 4. As the second actuator 4' is actuated, the first actuator is deactivated (e.g. by a power divert mechanism) so that there are no competing pulling forces. The belt 5 previously wound into the first actuator will be free to unwind during actuation of the second actuator 4'.

Figure 6:
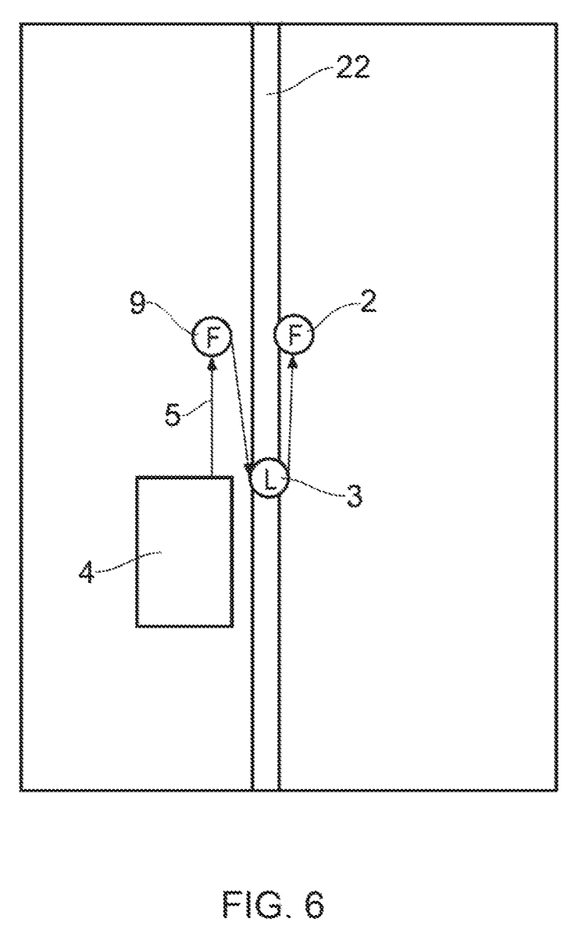
FIG. 6 shows an aerial view of a portion of an actuation arrangement according to a third embodiment.

FIG. 6 shows an aerial view of a portion of an actuation arrangement according to a third embodiment. In this embodiment, the arrangement further comprises a further fixed pulley 9 which is axially spaced from the fixed pulley 2, with the further fixed pulley 9 and fixed pulley 2 being on opposing axial sides of the actuator ring 22.

The belt 5 extends from the proximal end at the actuator 4 with the further loop portion looping around the further fixed pulley 9 within a circumferential groove and the loop portion looping around the movable pulley 3 within the circumferential groove before the belt extends to its distal end at the fixed pulley 2.

When the actuator 4 exerts a pulling force on the belt 5 by winding it within the actuator and thus reducing the length of the belt extending from the actuator, the force (actuation load) is transmitted through the belt 5 to the movable pulley to effect a circumferential movement of the movable pulley and hence the actuator ring 22 which results in an angle adjustment to open the stator vanes as shown in FIG. 4. This arrangement reduces the amount of force needed to move the actuator ring to ⅓ (since there are 3 lengths of belt extending between the pulleys).

Figure 7:
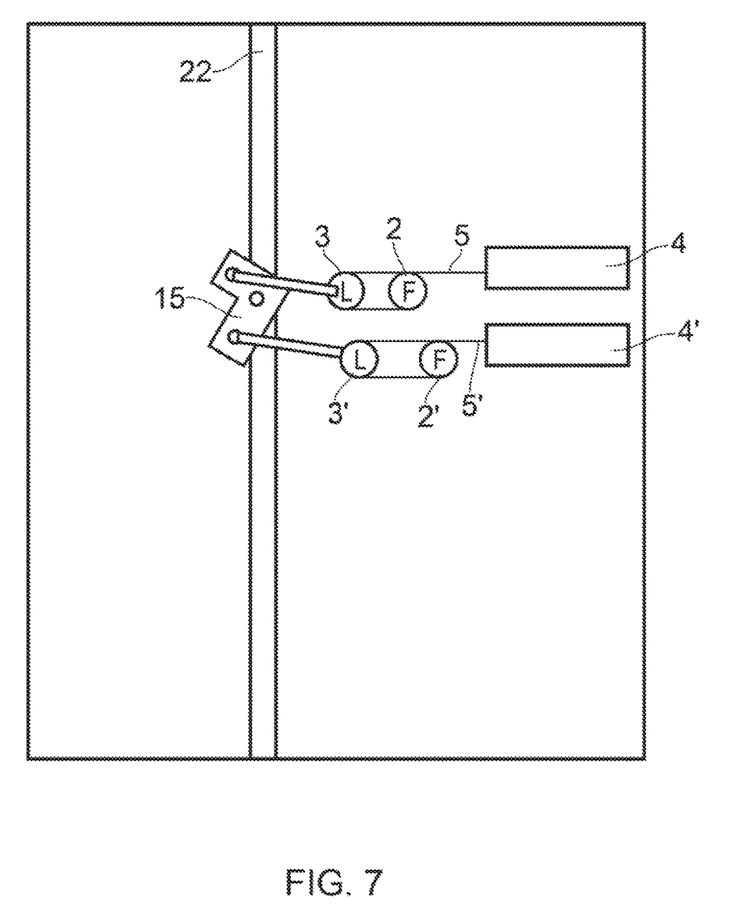
FIG. 7 shows an aerial view of a portion of an actuation arrangement according to a fourth embodiment.

In the fourth embodiment, shown in FIG. 7, the belt 5 extends from the proximal end at the actuator 4 to the fixed pulley 2 with the loop portion looping around the movable pulley 3 within the circumferential groove. A second belt 5' extends from the proximal end at the second actuator 4' to the second fixed pulley 2' with the second loop portion looping around the second movable pulley 3' within the circumferential groove.

The movable pulley 3 and second movable pulley 3' are both connected to an L-shaped lever 15 which is pivotally connected to the actuator connector 22. The movable pulley 3 is connected to one angled portion of the lever 15 whilst the second movable pulley 3' is connected to the second angled portion of the lever.

In the fourth embodiment, the movable pulleys 3, 3' are movable in an axial direction (between axial guide rails—not shown).

When the actuator 4 exerts a pulling force on the belt 5 by winding it within the actuator and thus reducing the length of the belt extending from the actuator, the force (actuation load) is transmitted through the belt 5 to the movable pulley 3 to effect a axial movement of the movable pulley 3 which pivots the lever 15 on the actuator ring and effects circumferential movement of the actuator ring 22.

In order to move the actuator ring 22 in the opposite direction, the second actuator 4' exerts a pulling force on the belt 5' by winding it within the actuator 4' and thus reducing the length of the belt extending from the actuator 4'. The force (actuation load) is transmitted through the belt 5' to the movable pulley 3' to effect a axial movement of the movable pulley 3' which pivots the lever 15 on the actuator ring 22 and effects circumferential movement of the actuator ring 22.

The actuators 4, 4' in the fourth embodiment could be replaced by a single actuator. The fixed pulleys 2, 2' in the fourth embodiment could be replaced by a single fixed pulley.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

All references referred to above are hereby incorporated by reference.

The invention claimed is:

1. An actuation arrangement for effecting actuation of a variable stator vane pivotally mounted on a tubular casing, said actuation arrangement comprising:
   an actuator connector connected to the variable stator vane via an actuating lever;
   an anchor fixedly mounted relative to the circumference of said tubular casing;
   an actuator; and
   a belt having a proximal end affixed to the actuator and a distal end affixed to the anchor,
wherein the actuation arrangement further comprises a movable pulley movable relative to said tubular casing and connected to the actuator connector, and wherein the belt has a loop portion provided between the proximal and distal ends which loops around the movable pulley, the loop portion for transferring forces generated in the belt by the actuator to the movable pulley to effect movement of the movable pulley and thereby the actuator connector towards the anchor to effect actuation of the variable stator vane via the actuating lever.

2. The actuation arrangement according to claim 1 wherein the actuator is a winding actuator adapted to wind or spool the belt to reduce the length of the belt extending from the actuator.

3. The actuation arrangement according to claim 1 wherein the movable pulley is movable in a circumferential direction about the tubular casing.

4. The actuation arrangement according to claim 3 further comprising at least one circumferentially-extending guide rail mounted on the tubular casing for supporting and guiding the movable pulley about the circumference of the tubular casing.

5. The actuation arrangement according to claim 1 wherein the movable pulley is movable in an axial direction along the tubular casing.

6. The actuation arrangement according to claim 5 further comprising at least one axially-extending guide rail mounted on the tubular casing for supporting and guiding the movable pulley along the tubular casing.

7. The actuation arrangement according to claim 1 wherein the actuator connector is an actuator ring that at least partially circumscribes the tubular casing.

8. The actuation arrangement according to claim 1 wherein the movable pulley is nearer to the actuator than the anchor and wherein the belt includes a further loop portion positioned between the proximal end and the loop portion which loops around the anchor or a further anchor.

9. The actuation arrangement according to claim 1 further comprising a biasing mechanism for biasing the anchor and movable pulley away from one another.

10. The actuation arrangement according to claim 1 further comprising a restoring mechanism comprising a resilient element connected between the tubular casing and the actuator connector.

11. The actuation arrangement according to claim 1 further comprising a second belt passing around a second movable pulley and connected to a second anchor.

12. The actuation arrangement according to claim 11 further comprising a second actuator connected to the second belt.

13. The actuation arrangement according to claim 11 wherein the anchor is a fixed pulley and/or the second anchor is a second fixed pulley.

14. The actuation arrangement according to claim 1 wherein at least one of the anchor and moveable pulley comprises at least one groove for housing the loop portion of the belt.

15. An axial multi-stage compressor comprising the actuation arrangement according to claim 1.

16. A gas turbine engine comprising the axial multi-stage compressor according to claim 15.

* * * * *